(12) United States Patent
Okuno et al.

(10) Patent No.: US 8,736,795 B2
(45) Date of Patent: May 27, 2014

(54) PAINT, RETARDATION ELEMENT, DISPLAY DEVICE, METHOD FOR MANUFACTURING RETARDATION ELEMENT

(75) Inventors: Moriaki Okuno, Tokyo (JP); Yukari Tsunoda, Tokyo (JP); Harumi Sato, Tokyo (JP); Kentaro Okuyama, Tokyo (JP); Masashi Enomoto, Tokyo (JP)

(73) Assignee: Dexerials Corporation, Tokyo (JP)

( * ) Notice: Subject to any disclaimer, the term of this patent is extended or adjusted under 35 U.S.C. 154(b) by 240 days.

(21) Appl. No.: 13/307,441

(22) Filed: Nov. 30, 2011

(65) Prior Publication Data

US 2012/0162572 A1  Jun. 28, 2012

(30) Foreign Application Priority Data

Dec. 22, 2010  (JP) ................. 2010-285642

(51) Int. Cl.
- *G02F 1/13363* (2006.01)
- *G02F 1/1335* (2006.01)
- *C09K 19/38* (2006.01)
- *C09K 19/54* (2006.01)
- *C09D 4/02* (2006.01)

(52) U.S. Cl.
USPC ........ 349/117; 349/61; 349/183; 252/299.01; 252/299.5

(58) Field of Classification Search
USPC ............ 428/1.1; 252/299.01, 299.5; 349/117, 349/183, 193, 61; 106/901
See application file for complete search history.

(56) References Cited

U.S. PATENT DOCUMENTS

| | | | |
|---|---|---|---|
| 6,338,808 B1 | 1/2002 | Kawata et al. | |
| 6,485,798 B1 | 11/2002 | Aminaka et al. | |
| 7,163,723 B2 * | 1/2007 | Tanaka et al. | 428/1.1 |
| 7,449,223 B2 | 11/2008 | Kawamura et al. | |
| 7,476,423 B2 * | 1/2009 | Hirai | 428/1.1 |
| 2004/0141121 A1 * | 7/2004 | Tanaka et al. | 349/117 |
| 2008/0014374 A1 * | 1/2008 | Hirai | 428/1.1 |
| 2009/0268138 A1 * | 10/2009 | Nakamura | 349/123 |

FOREIGN PATENT DOCUMENTS

| | | |
|---|---|---|
| JP | 2000-345164 | 12/2000 |
| JP | 3360787 | 10/2002 |
| JP | 2008-248061 | 10/2008 |
| JP | 4385997 | 10/2009 |
| JP | 2010-83781 | 4/2010 |

* cited by examiner

*Primary Examiner* — Shean C Wu
(74) *Attorney, Agent, or Firm* — Oliff PLC

(57) ABSTRACT

A retardation element includes an alignment film and a retardation layer in contact with a surface of the alignment film, and the retardation layer is formed by applying a paint containing a liquid crystal monomer and a non-liquid crystal monomer on the surface of the alignment film and then polymerizing the paint while the liquid crystal monomer is placed in an alignment state.

4 Claims, 14 Drawing Sheets

| | LIQUID CRYSTAL MONOMER | NON-LIQUID CRYSTAL MONOMER | ALIGNMENT EVALUATION | | |
|---|---|---|---|---|---|
| | TRADE NAME | TRADE NAME | 60°C | 70°C | 80°C |
| EXAMPLE | LC242 | TAIC | ○ | ○ | ○ |
| | | A9300 | × | ○ | ○ |
| | | A93001CL | × | ○ | ○ |
| | | ADCP | × | ○ | ○ |
| | | A-TMM-3L | × | ○ | ○ |
| | | M402 | ○ | ○ | ○ |
| | | M7300K | ○ | ○ | ○ |
| COMPARATIVE EXAMPLE | LC242 (*1) | — | × | × | × |

(*1) ALIGNMENT EVALUATION AT 110°C IS ○.

FIG. 2

| | LIQUID CRYSTAL MONOMER TRADE NAME | NON-LIQUID CRYSTAL MONOMER | | | | PAINT |
|---|---|---|---|---|---|---|
| | | STRUCTURE | TRADE NAME | NUMBER OF FUNCTIONAL GROUPS | VISCOSITY (mPa·s)(*1) | VISCOSITY (mPa·s) |
| EXAMPLE | LC242 | ISOCYANURIC RING | TAIC | 3 | 80 TO 110 | 4.40 (*2) |
| | | | A9300 | 3 | 1000 (50°C) | 4.60 (*2) |
| | | | A9300 1CL | 3 | 3000 TO 4000 | 4.64 (*2) |
| | | TRICYCLODECANE RING | ADCP | 2 | 120 | 4.00 (*2) |
| | | THREE-FUNCTIONAL ALKYL WITH OH GROUP | A-TMM-3L | 3 | 490 | 4.52 (*2) |
| | | SIX-FUNCTIONAL ALKYL | M402 | 6 | 5000 TO 7400 | 4.44 (*2) |
| | | POLYFUNCTIONAL POLYESTER | M7300K | POLYFUNCTIONS | 2000 TO 3000 | 4.40 (*2) |
| COMPARATIVE EXAMPLE | LC242 | | | | — | 5.00 (*3) |
| | RMS-013C | | | | — | 4.52 |

(*1) VISCOSITY AT 50°C ONLY IN THE CASE OF A9300, AND VISCOSITY AT 25°C IN THE OTHER CASES.

(*2) VISCOSITY AT 25°C OF MIXTURE CONTAINING 30 PERCENT BY WEIGHT OF LIQUID CRYSTAL MONOMER, 5 PERCENT BY WEIGHT OF NON-LIQUID CRYSTAL MONOMER ON WEIGHT RATIO TO CONTENT OF LIQUID CRYSTAL MONOMER, AND 68.5 PERCENT BY WEIGHT OF SOLUTION OF PGMEA: BUTYL ACETATE=50:50.

(*3) VISCOSITY AT 25°C OF MIXTURE CONTAINING 30 PERCENT BY WEIGHT OF LIQUID CRYSTAL MONOMER AND 70 PERCENT BY WEIGHT OF SOLUTION OF PGMEA: BUTYL ACETATE=50:50.

$l + m + n = 1$

A: ACRYLIC ACID
X: POLYALCOHOL
Y: POLYBASIC ACID

2-METHY1-1(4-METHYTHIOPHENYL)-2-MORPHOLINOPROPAN-1-ONE 4-(6-ACRYLOYLOXYHEXYLOXY)-BENZOIC ACID-(4-METHOXYPHENYLESTER)

4-(3-ACRYLOYLOXYPROPYLOXY)-BENZOIC ACID-2-METHYL-,
4-PHENYLENE ESTER 4-(6-ACRYLOYLOXYHEXYLOXY)-BENZOIC ACID-(4-CYANOPHENYLESTER)

2-METHYL-1, 4-PHENYLENE-BIS
[4-(6-ACRYLOYLOXYHEXYLOXY)-BENZOATE]

FIG. 12

| | LIQUID CRYSTAL MONOMER | NON-LIQUID CRYSTAL MONOMER | ALIGNMENT EVALUATION | | |
|---|---|---|---|---|---|
| | TRADE NAME | TRADE NAME | 60°C | 70°C | 80°C |
| EXAMPLE | LC242 | TAIC | ○ | ○ | ○ |
| | | A9300 | × | ○ | ○ |
| | | A93001CL | × | ○ | ○ |
| | | ADCP | × | ○ | ○ |
| | | A-TMM-3L | × | ○ | ○ |
| | | M402 | ○ | ○ | ○ |
| | | M7300K | ○ | ○ | ○ |
| COMPARATIVE EXAMPLE | LC242 (*1) | — | × | × | × |

(*1) ALIGNMENT EVALUATION AT 110°C IS ○.

FIG. 15

| | LIQUID CRYSTAL MONOMER TRADE NAME | NON-LIQUID CRYSTAL MONOMER TRADE NAME | BLACK LUMINANCE (cd/m²) | WHITE LUMINANCE (cd/m²) | CONTRAST |
|---|---|---|---|---|---|
| EXAMPLE | LC242 | TAIC | 4.5 | 3314 | 742 |
| | | A9300 | 4.3 | 3443 | 807 |
| | | A93001CL | 5.2 | 3915 | 755 |
| | | ADCP | 6.7 | 3719 | 557 |
| | | A-TMM-3L | 7.1 | 3444 | 482 |
| | | M402 | 6.3 | 3394 | 540 |
| | | M7300K | 76.0 | 3417 | 574 |
| COMPARATIVE EXAMPLE | LC242 | — | 12.1 | 3901 | 323 |

FIG. 16

| | LIQUID CRYSTAL MONOMER | NON-LIQUID CRYSTAL MONOMER | Tg (°C) | RETARDATION REDUCTION RATE (DRY CONDITION AT 90°C FOR 500 HOURS) | RETARDATION REDUCTION RATE (CONDITION AT 60°C AND 90% RH FOR 500 HOURS) |
|---|---|---|---|---|---|
| | TRADE NAME | TRADE NAME | | | |
| COMPARATIVE EXAMPLE 1 | RMS-013C | — | 68 | 2.7 | 4.2 |
| COMPARATIVE EXAMPLE 2 | LC242 | — | 100 | 2.1 | 2.6 |
| EXAMPLE 1 | LC242 | A9300 | 100 | 2.1 | 2.6 |

FIG. 21

| | LIQUID CRYSTAL MONOMER | NON-LIQUID CRYSTAL MONOMER | PROCESS TEMPERATURE (°C) | CROSSTALK (%) |
|---|---|---|---|---|
| | TRADE NAME | TRADE NAME | | |
| COMPARATIVE EXAMPLE 3 | RMS-013C | — | 80 | 1.16 |
| COMPARATIVE EXAMPLE 4 | LC242 | — | 80 | 2.56 |
| COMPARATIVE EXAMPLE 5 | LC242 | — | 110 | 1.14 |
| EXAMPLE 2 | LC242 | A9300 | 80 | 0.82 |

PAINT, RETARDATION ELEMENT, DISPLAY DEVICE, METHOD FOR MANUFACTURING RETARDATION ELEMENT

CROSS REFERENCE TO RELATED APPLICATION

The present application claims priority to Japanese Patent Application No. 2010-285642 filed on Dec. 22, 2010, the disclosure of which is incorporated herein by reference.

BACKGROUND

The present disclosure relates to a paint containing a liquid crystal monomer and a retardation element manufactured by using the paint. In addition, the present disclosure relates to a display device including the above retardation element. Furthermore, the present disclosure relates to a method for manufacturing the above retardation element.

As a stereoscopic image display device using a pair of polarized glasses, there has been a device which emits different types of light in polarization state from a left-eye pixel and a right-eye pixel. In the display device as described above, after a viewer wears a pair of polarized glasses, light emitted from a left-eye pixel is allowed to enter only the left eye of the viewer, and light emitted from a right-eye pixel is allowed to enter only the right eye of the viewer, so that a stereoscopic image can be observed.

For example, according to Japanese Patent No. 3360787, in order to emit different types of light in polarization state from a left-eye pixel and a right-eye pixel, a retardation element is used. In this retardation element, a retardation region having a lagging axis or a leading axis in one direction is provided corresponding to the left-eye pixel, and a retardation region having a lagging axis or a leading axis in one direction different from the direction of the above retardation region is provided corresponding to the right-eye pixel.

Accordingly, many methods for solving the problem described above have been proposed in the past. For example, Japanese Unexamined Patent Application Publication No. 2008-248061 has disclosed a technique in which before a step of curing a liquid crystal layer applied on an alignment film, a heating temperature of the liquid crystal layer is increased to a temperature at which the liquid crystal layer shows a liquid crystal phase. However, when a polyfunctional liquid crystal monomer is used as a liquid crystal monomer, the temperature at which the liquid crystal layer shows a liquid crystal phase is increased so as to induce thermal polymerization, and as a result, the uniformity of the liquid crystal alignment is disadvantageously degraded.

SUMMARY

The retardation element described above is formed, for example, by applying a liquid crystal layer containing liquid crystal monomer molecules on an alignment film, the surface of which is processed by a rubbing treatment, followed by heating for curing. By the way, when the liquid crystal layer is applied on the alignment film, among the liquid crystal monomer molecules contained in the liquid crystal layer, liquid crystal monomers located in the vicinity of the alignment film are aligned by an alignment restraining force thereof. However, among the liquid crystal monomer molecules contained in the liquid crystal layer, the alignment restraining force of the alignment film is not likely to work on liquid crystal monomer molecules located far from the alignment film. Therefore, alignment defects are liable to occur, and the yield is advantageously liable to decrease.

Accordingly, many methods for solving the problem described above have been proposed in the past. For example, Japanese Unexamined Patent Application Publication No. 2008-248061 has disclosed a technique in which before a step of curing a liquid crystal layer applied on an alignment film, a heating temperature of the liquid crystal layer is increased to a temperature at which the liquid crystal layer shows a liquid crystal phase. However, when a polyfunctional liquid crystal monomer is used as a liquid crystal monomer, the temperature at which the liquid crystal layer shows a liquid crystal phase is increased so as to induce thermal polymerization, and as a result, the uniformity of the liquid crystal alignment is disadvantageously degraded.

In order to solve the above problem, in order to lower the viscosity and the temperature at which the liquid crystal phase is obtained, it has been considered to add a liquid crystal monomer having a low molecular weight or a monofunctional liquid crystal monomer. However, when the liquid crystal monomer having a low molecular weight or the monofunctional liquid crystal monomer is added to the liquid crystal layer, a heat resistant temperature (Tg) of a sheet formed by curing the liquid crystal layer applied on an alignment film is decreased. As a result, decrease in mechanical strength of the sheet and degradation in dimensional stability and retardation caused by heat disadvantageously occur. In addition, Japanese Unexamined Patent Application Publication No. 2010-83781 has disclosed a curable liquid crystal material which can ensure mechanical strengths of a sheet while decreasing the temperature at which the liquid crystal phase is obtained; however, this curable liquid crystal material is a special material and has problems in terms of manufacturing cost and productivity.

Japanese Unexamined Patent Application Publication No. 2000-345164 has disclosed an additive which is mixed with a polymerizable liquid crystal material to control the alignment of liquid crystal molecules in the vicinity of an interface with air. However, even if this additive is used, it is practically difficult to ideally control the alignment of the liquid crystal molecules in the vicinity of the interface with air. Furthermore, since being a low-molecular compound, this additive may not all be localized in the vicinity of the interface with air and may partially remain inside a liquid crystal layer, and as a result, the phase transition point of the liquid crystal material is decreased. As a result, problems in that dimensional stability and retardation are degraded by heat occur.

Japanese Patent No. 4385997 has disclosed that a small amount of an acrylic copolymer having a fluorine group is added to a liquid crystal paint. By this technique, since the acrylic copolymer moves to the vicinity of an interface with air by a fluorine effect, the liquid-liquid crystal transition temperature in the vicinity of the interface with air decreases, so that the alignment restraining force of an alignment film effectively works even in the vicinity of the interface with air. As a result, the number of alignment defects can be reduced. However, in this case, it is necessary to prepare an acrylic copolymer having controlled molecular weight and structure, and hence there is a problem in terms of manufacturing cost and productivity.

The present disclosure was made in consideration of this problem, and first, it is desirable to provide a paint containing a liquid crystal monomer which can realize a low viscosity and a high heat resistant temperature (Tg) by using a commonly available material. Next, it is also desirable to provide a retardation element formed from the paint as described above and a display device including the retardation element.

Furthermore, it is also desirable to provide a method for manufacturing a retardation element using the paint described above.

A paint according to an embodiment of the present disclosure contains a liquid crystal monomer and a non-liquid crystal monomer. In the paint according to an embodiment of the present disclosure, the non-liquid crystal monomer enters between molecules of the liquid crystal monomer contained in this paint, and the interaction between the molecules of the liquid crystal monomer is decreased.

A retardation element according to an embodiment of the present disclosure includes an alignment film and a retardation layer in contact with a surface thereof. In this retardation element, the retardation layer is formed by applying a paint containing a liquid crystal monomer and a non-liquid crystal monomer on the surface of the alignment film and then polymerizing the paint while the liquid crystal monomer is placed in an alignment state.

A display device according to an embodiment of the present disclosure includes a display panel driven by an image signal, a backlight illuminating the display panel from a rear surface thereof, and a retardation element provided at an opposite side of the backlight with respect to the display panel. In this display device, the retardation element included therein has the same constituent elements as those of the retardation element described above.

In the retardation element and the display device according to embodiments of the present disclosure, the retardation layer on the alignment film is formed using a paint containing a liquid crystal monomer and a non-liquid crystal monomer. In this case, since the non-liquid crystal monomer is contained in the paint, the non-liquid crystal monomer enters between molecules of the liquid crystal monomer contained in the paint, and the interaction between the molecules of the liquid crystal monomer is decreased.

A method for manufacturing a retardation element according to an embodiment of the present disclosure includes applying a paint containing a liquid crystal monomer and a non-liquid crystal monomer on a surface of an alignment film, and while the liquid crystal monomer is placed in an alignment state, polymerizing the paint to form a retardation layer.

In the method for manufacturing a retardation element according to an embodiment of the present disclosure, the non-liquid crystal monomer is contained in the paint applied on the alignment film. Accordingly, the non-liquid crystal monomer enters between molecules of the liquid crystal monomer contained in the paint, and hence, the interaction between the molecules of the liquid crystal monomer is decreased.

Incidentally, in the paint, the retardation element, the display device, and the method for manufacturing a retardation element according to embodiments of the present disclosure, the non-liquid crystal monomer is, for example, a polymerizable monomer having a methacrylate or an acrylate structure. In addition, according to an embodiment of the present disclosure, the non-liquid crystal monomer preferably has an isocyanuric ring structure having at least three functional groups. Furthermore, according to an embodiment of the present disclosure, the content of the non-liquid crystal monomer is preferably 5 to 10 percent by weight on a weight ratio to that of the liquid crystal monomer.

In the paint according to an embodiment of the present disclosure, since the interaction between the molecules of the liquid crystal monomer contained in the paint is decreased, compared with the case in which the non-liquid crystal monomer is not contained in the paint, the viscosity thereof can be decreased. In addition, according to an embodiment of the present disclosure, even if a liquid crystal monomer having a monofunctional group is not contained, a low viscosity equivalent to or lower than the viscosity of a paint containing a large amount of a liquid crystal monomer having a monofunctional group (that is, the viscosity is equivalent to or lower than the viscosity of a related paint) can be realized. Accordingly, even if the liquid crystal monomer having a monofunctional group is not contained at all in the paint or is contained only in a small amount therein, a low viscosity which is practically usable can be realized. As a result, when the liquid crystal monomer having a monofunctional group is not contained at all in the paint or is contained only in a small amount therein, and when the paint is cured to form a sheet, the heat resistant temperature (Tg) of the sheet can be sufficiently increased higher than the heat resistant temperature (Tg) of a sheet formed by curing a paint containing a large amount of the liquid crystal monomer having a monofunctional group. In addition, as the non-liquid crystal monomer, for example, polymerizable monomers each having a methacrylate or an acrylate structure may be mentioned. These materials described above are commonly available materials and are not special materials. As described above, according to an embodiment of the present disclosure, a low viscosity and a high heat resistant temperature (Tg) can both be realized.

In addition, in the retardation element, the display device, and the method for manufacturing a retardation element according to embodiments of the present disclosure, since the retardation layer is formed using the paint having a small interaction working between the molecules of the liquid crystal monomer, even if the liquid crystal monomer having a monofunctional group is not contained at all in the paint or is contained only in a small amount therein, the retardation layer can be formed at a low viscosity which is practically usable. Accordingly, for example, when the liquid crystal monomer having a monofunctional group is not contained at all in the paint or is contained only in a small amount therein, and when the paint is applied on an alignment film, followed by curing to form a retardation element, the heat resistant temperature (Tg) of the retardation element can be sufficiently increased higher than the heat resistant temperature (Tg) of a retardation element formed by curing a paint containing a large amount of the liquid crystal monomer having a monofunctional group. In addition, a material used for the non-liquid crystal monomer contained in the paint is a commonly available material and is not a special material. Therefore, in the retardation element and the method for manufacturing the same according to embodiments of the present disclosure, a retardation element having a high heat resistant temperature (Tg) can be realized using a commonly available material.

As a result, since the change in dimension of the retardation element caused by heating is decreased, the temperature dependence of optical properties of the retardation element can be reduced. In addition, in the display device according to an embodiment of the present disclosure, since the retardation element having a low temperature dependence of optical properties is used, the display quality can be improved. Furthermore, crosstalk can be reduced when the retardation element having a low temperature dependence of optical properties is used for a three-dimensional display device.

By the way, as described above, even if the liquid crystal monomer having a monofunctional group is not contained, the viscosity of the paint according to an embodiment of the present disclosure is equal to or lower than the viscosity of a paint containing a large amount of the liquid crystal monomer having a monofunctional group. Therefore, for example, although the temperature (so-called drying temperature) to align a liquid crystal monomer on an alignment film is not increased to as high as more than 100° C., the liquid crystal monomer on the alignment film can be aligned.

Incidentally, the drying temperatures is a temperature relating to the transition temperature (so-called N-I phase transition temperature) from an isothermal phase (I phase) to a nematic phase (N phase). In particular, for measurement of the drying temperature, after a paint applied on a surface of an alignment film is cured by heating to form a hard sheet, and this sheet is disposed between a pair of polarizers placed in a cross Nicol arrangement, light is allowed to enter from one polarizer side, and light emitted from the other polarizer (that is, transmitted light) is observed. The lowest temperature among temperature conditions in which the number of bright points (point at which the luminance is locally high) contained in an area of $3.0 \times 10^5$ μm$^2$ is 10 or less is regarded as the drying temperature. Although the bright point corresponds to a position at which an alignment defect is generated in the liquid crystal monomer, a position at which the bright point is not observed by an optical microscope (that is, a black area) corresponds to a position at which an alignment defect is not generated in the liquid crystal monomer or a position at which even if being generated, the alignment defect is so slight that it may not be observed by an optical microscope.

When the drying temperature exceeds 100° C., in view of dimensional accuracy, it becomes difficult to use a resin film as a substrate supporting the alignment film and the paint. Therefore, when a resin film is used as a substrate supporting the alignment film and the paint, the drying temperature is preferably set to 100° C. or less (such as 60° C. to 80° C.). In the paint according to an embodiment of the present disclosure, even if the liquid crystal monomer having a monofunctional group is not contained, the viscosity equivalent to or lower than the viscosity of a paint containing a large amount of the liquid crystal monomer having a monofunctional group can be realized. Accordingly, in the paint according to an embodiment of the present disclosure, even if the liquid crystal monomer having a monofunctional group is not contained at all or is contained only in a small amount, the drying temperature can be set to 100° C. or less, and a resin film can be used as a substrate supporting the alignment film and the paint.

In addition, in the case in which a monomer which has an isocyanuric ring structure having at least three functional groups is used as the non-liquid crystal monomer in the paint according to an embodiment of the present disclosure, compared with the case in which another monomer is used as the non-liquid crystal monomer, when the weight content of the non-liquid crystal monomer and the drying temperature are respectively set equal to those of the above comparative case, the number of bright points contained in an area of $3.0 \times 10^5$ μm$^2$ can be reduced or can be made zero. In addition, when the monomer which has an isocyanuric ring structure having at least three functional groups is used as the non-liquid crystal monomer, the number of slight alignment defects which may not be observed by an optical microscope can also be significantly reduced as well as the number of bright points. Hence, for example, in the case in which the monomer which has an isocyanuric ring structure having at least three functional groups is used as the non-liquid crystal monomer, when the content of the non-liquid crystal monomer is set to 5 to 10 percent by weight on a weight ratio to that of the liquid crystal monomer, the number of bright points contained in 1 μm$^2$ can be made zero, and furthermore, the number of slight alignment defects which may not be observed by an optical microscope moreover can also be significantly reduced. As a result, the black luminance in the black area can be significantly reduced.

Additional features and advantages are described herein, and will be apparent from the following Detailed Description and the figures.

BRIEF DESCRIPTION OF THE FIGURES

FIG. 2 is a table showing the relationship of viscosities with materials contained in the paint shown in FIG. 1 and related liquid crystal materials;

FIG. 12 is a table showing the relationship between alignment evaluation and materials of examples and a comparative example;

FIG. 15 is a table showing the relationship of the materials of the examples and the comparative example with the black luminance, the white luminance, and the contrast;

FIG. 16 is a table showing the relationship of the materials of an example and comparative examples with the heat resistant temperature (Tg) and the retardation reduction rate;

FIG. 21 is a table showing the relationship of the materials of an example and comparative examples with the process temperature and crosstalk.

DETAILED DESCRIPTION

Embodiments of the present application will be described below in detail with reference to the drawings.

Hereinafter, embodiments of the present disclosure will be described in detail with reference to the drawings. Description will be made in the following order.

1. First embodiment (paint)
2. Second embodiment (retardation element)
3. Third embodiment (display device)

1. First Embodiment

Figure 1:
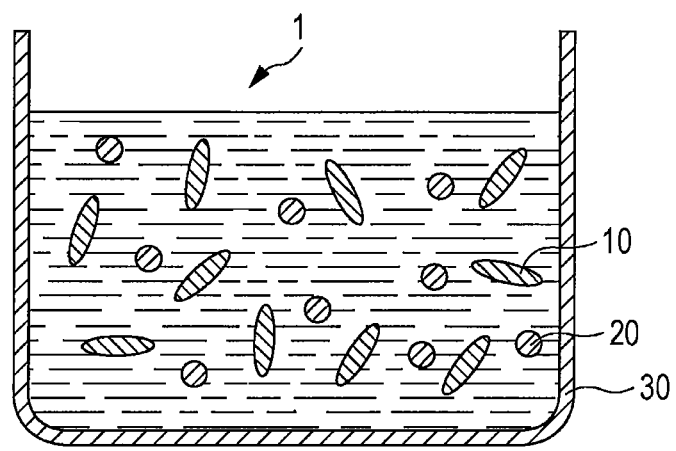
FIG. 1 is a schematic view showing one example of the composition of a paint according to a first embodiment of the present disclosure.

First, a paint 1 according to a first embodiment of the present disclosure will be described. As shown in FIG. 1, the paint 1 is, for example, a liquid material which can be accommodated in a container 30 and contains a liquid crystal monomer 10 and a non-liquid crystal monomer 20. In addition, the paint 1 may also contain materials other than the liquid crystal monomer 10 and the non-liquid crystal monomer 20 and, for example, may contain an initiator, a surfactant, a polymerization inhibitor, a plasticizer, and/or a viscosity modifier.

Columns of an example of FIG. 2 show materials used as the liquid crystal monomer 10 and the non-liquid crystal monomer 20 by way of example. Columns of a comparative example of FIG. 2 show liquid crystal paints which are now commercially available. Although the columns of the example of FIG. 2 show the materials which can be used as the liquid crystal monomer 10 and the non-liquid crystal monomer 20 by way of example, materials which can be used as the liquid crystal monomer 10 and the non-liquid crystal monomer 20 are not limited to those shown in the columns of the example of FIG. 2.

Figure 3:
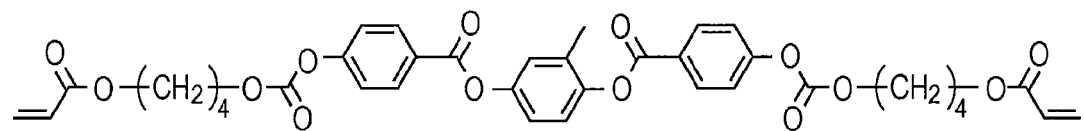
FIG. 3 shows the structure of LC242 shown in FIG. 2.

The liquid crystal monomer 10 is a monomer having liquid crystallinity and is formed, for example, of liquid crystal monomer LC242 manufactured by BASF Ltd. as shown in the column of the example of FIG. 2. LC242 has the structure shown in FIG. 3. In addition, the liquid crystal monomer 10 is not limited to the material shown in the column of the example of FIG. 2 and may be formed, for example, of a liquid crystal monomer shown in the following FIG. 11B or 11C. The content of the liquid crystal monomer 10 is set, for example, in a range of 10 to 50 percent by weight.

The non-liquid crystal monomer 20 is a monomer having no liquid crystallinity and is, in particular, a polymerizable monomer having a methacrylate or an acrylate structure. The content of the non-liquid crystal monomer 20 is 1 percent by weight or more on a weight ratio to that of the liquid crystal monomer 10. By this non-liquid crystal monomer, an effect of decreasing the viscosity of the paint 1 lower than the viscosity of the liquid crystal monomer 10 can be obtained. The content of the non-liquid crystal monomer 20 is preferably 5 percent by weight or more on a weight ratio to that of the liquid crystal monomer 10. Accordingly, even in a low-temperature (such as 25° C.) environment, the viscosity of the paint 1 can be decreased to a level at which it is practically usable. However, if the content of the non-liquid crystal monomer 20 is increased to more than 10 percent by weight on a weight ratio to that of the liquid crystal monomer 10, the number of alignment defects after an alignment treatment is increased, and as a result, the drying temperature, which will be described later, may exceed 100° C., or no alignment occurs at all. Therefore, the content of the non-liquid crystal monomer 20 is preferably set to 5 to 10 percent by weight.

As the polymerizable monomer having a methacrylate or an acrylate structure, for example, as shown in the columns of the example of FIG. 2, a polymerizable monomer having an isocyanuric ring structure, a tricyclodecane structure, a three-functional alkyl structure with an OH group, a six-functional alkyl structure, or a polyfunctional polyester structure may be mentioned. The isocyanuric ring structure can be analyzed, for example, by using an IR (infrared spectroscopy) method or a TOF-SIMS (time-of-flight secondary ion mass spectroscopy) method.

Figure 4:
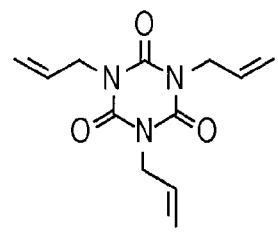
FIG. 4 shows the structure of TAIC shown in FIG. 2.
Figure 5:
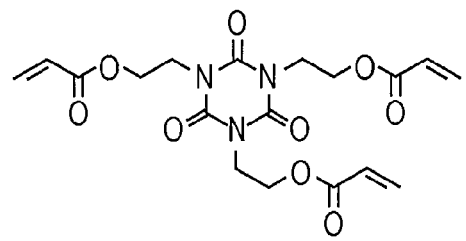
FIG. 5 shows the structure of A9300 shown in FIG. 2.
Figure 6:
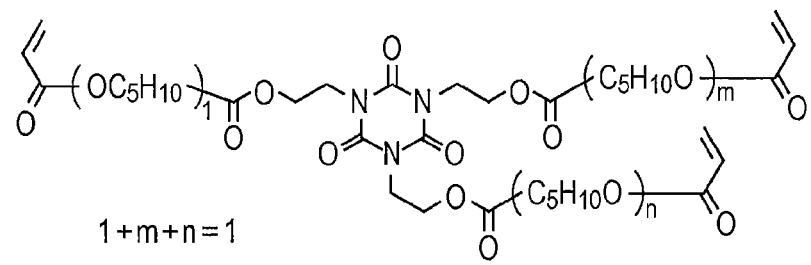
FIG. 6 shows the structure of A9300-1CL shown in FIG. 2.

In the case described above, as the polymerizable monomer having an isocyanuric ring structure, for example, tri-functional polymerizable monomers, such as TAIC (manufactured by Nippon Kasei Chemical Co., Ltd.), A9300 (manufactured by Shin-Nakamura Chemical Co., Ltd.), and A93001CL (manufactured by Shin-Nakamura Chemical Co., Ltd.), may be mentioned. The polymerizable monomer having an isocyanuric ring structure also includes a polymerizable monomer having at least four functions. In this embodiment, TAIC has the structure shown in FIG. 4. A9300 has the structure shown in FIG. 5. A93001CL has the structure shown in FIG. 6. In each of TAIC and A9300, the branches extending from the respective three nitrogen atoms of the ring structure have the same structure. In addition, in A93001CL, the branches extending from the respective three nitrogen atoms of the ring structure include a common structure.

Figure 7:
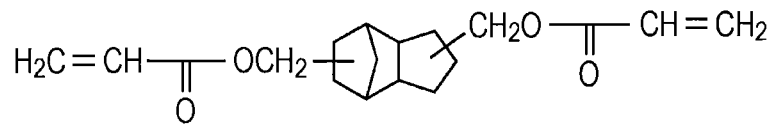
FIG. 7 shows the structure of ADCP shown in FIG. 2.
Figure 8:
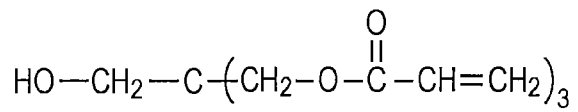
FIG. 8 shows the structure of A-TMM-3L shown in FIG. 2.
Figure 9:
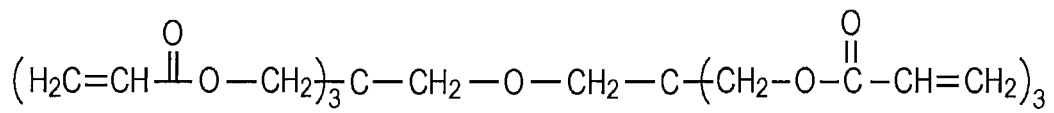
FIG. 9 shows the structure of M402 shown in FIG. 2.
Figure 10:
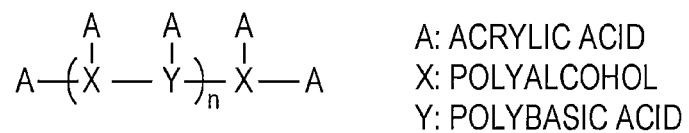
FIG. 10 shows the structure of M7300K shown in FIG. 2.

As the polymerizable monomer having a tricyclodecane ring structure, for example, ADCP (manufactured by Shin-Nakamura Chemical Co., Ltd.) may be mentioned. ADCP has the structure shown in FIG. 7. As the polymerizable monomer having a three-functional alkyl structure with an OH group, for example, A-TMM-3L (manufactured by Shin-Nakamura Chemical Co., Ltd.) may be mentioned. A-TMM-3L has the structure shown in FIG. 8. As the polymerizable monomer having a six-functional alkyl structure, for example, M402 (manufactured by Toagosei Co., Ltd.) may be mentioned. M402 has the structure shown in FIG. 9. As the polymerizable monomer having a polyfunctional polyester structure, for example, M7300K (manufactured by Toagosei Co., Ltd.) may be mentioned. M7300K has the structure shown in FIG. 10.

The various materials shown in the columns of the example of FIG. 2 as the example of the non-liquid crystal monomer 20 are each so called a cross linking agent, and when added to a liquid material, the above materials each generally have an effect of increasing the viscosity of the liquid material. However, the various materials shown in the columns of the example of FIG. 2 as the example of the non-liquid crystal monomer 20 have an effect to decrease the viscosity of the liquid crystal monomer 10. The reason for this is that as schematically shown in FIG. 1, since the non-liquid crystal monomer 20 enters between molecules of the liquid crystal monomer 10, the interaction between the molecules of the liquid crystal monomer 10 adjacent to each other is disturbed. Hence, although being different from the materials shown in the columns of the example of FIG. 2, a material which is a polymerizable monomer having a methacrylate or an acrylate structure and which has an effect of disturbing the interaction between adjacent molecules of the liquid crystal monomer 10 can be used as the non-liquid crystal monomer 20.

As shown in the columns of the example of FIG. 2, the viscosity of a paint containing 30 percent by weight of liquid crystal monomer LC242 manufactured by BASF Ltd. as the liquid crystal monomer 10, 5 percent by weight of the material shown in FIG. 2 as the non-liquid crystal monomer 20 on a weight ratio to the content of the liquid crystal monomer 10, and 68.5 percent by weight of a solution of PGMEA:butyl acetate=50:50 is actually 4.40 to 4.64 mPa·s at 25° C. This value is significantly lower than the viscosity (5.00 mPa·s) (see the column of the comparative example of FIG. 2) of a paint containing 30 percent by weight of liquid crystal monomer LC242 manufactured by BASF Ltd. and 70 percent by weight of a solution of PGMEA:butyl acetate=50:50 at 25° C. In addition, this value is a value equivalent to the viscosity (4.52 mPa·s) (see the column of the comparative example of FIG. 2.) of liquid crystal paint RMS-013C manufactured by Merck (30 percent by weight of liquid crystal) which is one of liquid crystal paints now available on the market, and this value is a value which is practically usable. The viscosity described above is a measured value obtained by using a rotational viscometer RE550L manufactured by Toki Sangyo Co., Ltd.

In addition, RMS-013C contains liquid crystal monomers shown in FIGS. 11A to 11E, and the content of each liquid crystal monomer is controlled so that the total content of all the liquid crystal monomers shown in FIGS. 11A to 11E is 30 percent by weight. In this embodiment, the content of each liquid crystal monomer is controlled in the following range.

Figure 11A:
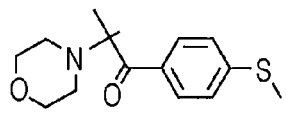
FIGS. 11A to 11E each show the structure of a liquid crystal monomer contained in RMS-013C shown in FIG. 2.

Material shown in FIG. 11A: 1 to less than 2.5 percent by weight

Figure 11B:
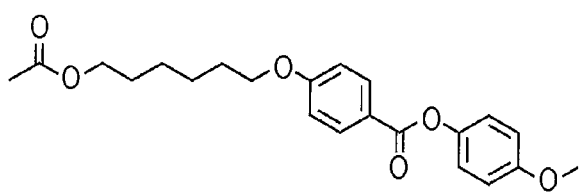

Material shown in FIG. 11B: 1 to less than 10 percent by weight

Figure 11C:
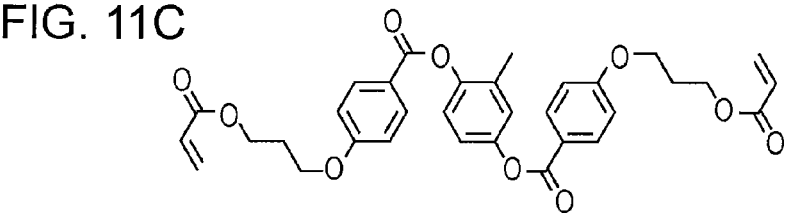

Material shown in FIG. 11C: 1 to less than 10 percent by weight

Figure 11D:
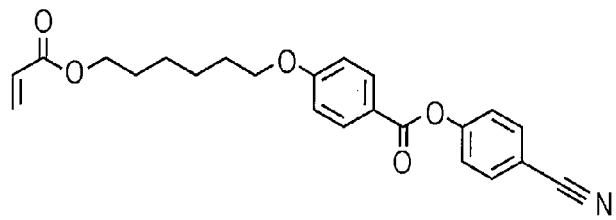

Material shown in FIG. 11D: 10 to less than 25 percent by weight

Figure 11E:
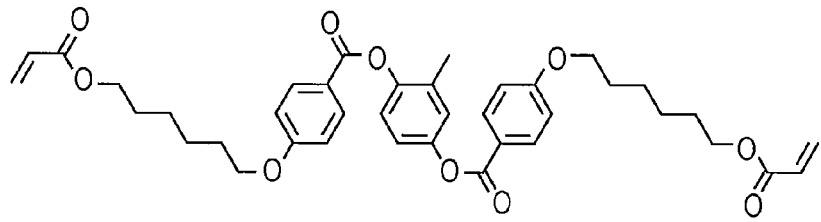

Material shown in FIG. 11E: 1 to less than 10 percent by weight

Therefore, in the paint 1 of this embodiment, the viscosity thereof can be decreased as compared with that obtained when the non-liquid crystal monomer 20 is not contained in the paint. Furthermore, in the paint 1 of this embodiment, even if the liquid crystal monomer having a monofunctional group is not contained, the viscosity equivalent to or lower than the viscosity (that is, viscosity equivalent to or lower than that of a related paint) of a paint containing a large amount of the liquid crystal monomer having a monofunctional group (such as the aforementioned RMS-013C) can be realized. Accordingly, even if the liquid crystal monomer having a monofunctional group is not contained at all in the paint 1 or is contained only in a small amount therein, a low viscosity which is practically usable can be realized.

As a result, in the case in which the liquid crystal monomer having a monofunctional group is not contained at all in the paint 1 or is contained only in a small amount therein, when the paint 1 is formed into a sheet by curing, the heat resistant temperature (Tg) of the sheet can be sufficiently increased higher than the heat resistant temperature (Tg) of a sheet formed by curing a paint containing a large amount of the liquid crystal monomer having a monofunctional group. For example, the heat resistant temperature (Tg) of the sheet formed by curing RMS-013C is 68° C. On the other hand, for example, as the paint 1, when a paint is formed using one of the materials shown in the columns of the example of FIG. 2 as the non-liquid crystal monomer 20 without any liquid crystal monomer having a monofunctional group and is then formed into a sheet by curing, the heat resistant temperature (Tg) of the sheet thus obtained is in a range of 99° C. to 105° C. That is, in this example, the heat resistant temperature (Tg) is higher than the heat resistant temperature (Tg) formed by curing RMS-013C by 30° C. or more. Therefore, in the case in which a paint is formed as the paint 1 using one of the materials shown in the columns of the example of FIG. 2 as the non-liquid crystal monomer 20 and a liquid crystal monomer having a monofunctional group in a very small amount (such as approximately several percent by weight on a weight ratio to the content of the liquid crystal monomer 10) and is then formed into a sheet by curing, it is also believed that the heat resistant temperature (Tg) is higher than the heat resistant temperature (Tg) of the sheet formed by curing RMS-013C. In addition, the materials used for the non-liquid crystal monomer 20 are commonly available materials and are not special materials. As described above, in the paint 1 of this embodiment, a low viscosity and a high heat resistant temperature (Tg) can be realized by using a commonly available material.

In addition, in this embodiment, even if the liquid crystal monomer having a monofunctional group is not contained at all or is contained only in a small amount as described above, the paint 1 having a low viscosity which is practically usable can be realized. Accordingly, for example, in the case in which after the paint 1 is applied on an alignment film, an alignment treatment is performed on the paint 1 without providing an alignment film on the upper surface thereof, an alignment restraining force of the alignment film can also be allowed to work on molecules of the liquid crystal monomer 10 distributed in the upper surface of the paint 1. As a result, although the non-liquid crystal monomer 20 which can also be regarded as an impurity is contained in the paint 1, good alignment characteristics can be obtained, and a high yield can be realized.

FIG. 12 shows the evaluation results of the alignment characteristics of a paint (paint of the example) which is obtained by using the materials shown in the columns of the example of FIG. 2 and a paint (paint of the comparative example) which is obtained by using the material (LC242) shown in the column of the comparative example of FIG. 2. After the paint formed under the following conditions shown below was applied on a predetermined alignment film and was then cured into a hard sheet by heating at 60° C., 70° C., or 80° C., it was evaluated whether the alignment characteristics of the sheet were in a desired alignment state or not, and the results are shown in FIG. 12. In addition, shown in FIG. 12 indicates that the alignment characteristics are in a desired alignment state, and x shown in FIG. 12 indicates that the alignment characteristics are not in a desired alignment state.

(Conditions of Paint According to Example)

As the liquid crystal monomer, 17.68 percent by weight of the material shown in the column of the example of FIG. 2 was used. As the non-liquid crystal monomer, 5 percent by weight of the material shown in the column of the example of FIG. 2 on a weight ratio to the content of the liquid crystal monomer was used. As the other materials, 0.98 percent by weight of initiator IRG907 (manufactured by BASF Ltd.), 0.096 percent by weight of surfactant B330 (BYK Japan KK), and 80.4 percent by weight of a solution of PGMEA:butyl acetate=50:50 were used.

(Conditions of Paint According to Comparative Example)

As the liquid crystal monomer, 17.8 percent by weight of LC242 was used. As the other materials, 0.99 percent by weight of initiator IRG907 (manufactured by BASF Ltd.), 0.099 percent by weight of surfactant B330 (BYK Japan KK), and 81.0 percent by weight of a solution of PGMEA:butyl acetate=50:50 were used.

For the evaluation whether a desired alignment state is obtained or not, the concept of the drying temperature is used. For measurement of the drying temperature, after the sheet formed as described above is disposed between a pair of polarizers in a cross Nicol arrangement, light is allowed to enter from one polarizer side, and light emitted from the other polarizer (that is, transmitted light) is observed. When the number of bright points (point at which the luminance is locally high) contained in an area of $3.0 \times 10^5$ μm$^2$ is 10 or less, it is evaluated that the alignment characteristics are in a desired alignment state. When the number of bright points contained in an area of $3.0 \times 10^5$ μm$^2$ is more than 10, it is evaluated that the alignment characteristics are not in a desired alignment state.

Incidentally, the drying temperatures is a temperature relating to the transition temperature (so-called N-I phase transition temperature) from an isothermal phase (I phase) to a nematic phase (N phase). In particular, for measurement of the drying temperature, after a paint applied on the surface of an alignment film is cured by heating to form a hard sheet, and this sheet is disposed between a pair of polarizers in a cross Nicol arrangement, light is allowed to enter from one polarizer side, and light emitted from the other polarizer (that is, transmitted light) is observed. The lowest temperature among temperature conditions in which the number of bright points (point at which the luminance is locally high) contained in an area of $3.0 \times 10^5$ µm$^2$ is 10 or less is regarded as the drying temperature. Although the bright point corresponds to a position at which an alignment defect is generated in the liquid crystal monomer, a position at which the bright point is not observed by an optical microscope (that is, a black area) corresponds to a position at which an alignment defect is not generated in the liquid crystal monomer or a position at which even if being generated, the alignment defect is so slight that it may not be observed by an optical microscope.

It is found from the columns of the example shown in FIG. 12 that even if any one of the materials of the columns of the example shown in FIG. 12 is used as the non-liquid crystal monomer, the evaluation results at 70° C. and 80° C. are o. In addition, it is also found from the columns of the example shown in FIG. 12 that when TAIC or M7300K is used as the non-liquid crystal monomer, the evaluation result at 60° C. is also o. From the results thus obtained, when the polymerizable monomer having a methacrylate or an acrylate structure is used as the non-liquid crystal monomer, the liquid crystal monomer on the alignment film can be aligned without increasing the temperature (that is, the above drying temperature) to align the liquid crystal monomer to a high temperature of more than 100° C. As described above, it is found that by the paint of this example, the viscosity of the paint is not only decreased but the drying temperature can also be decreased.

On the other hand, it is found from the columns of the comparative example of FIG. 12 that when the non-liquid crystal monomer is not used, the evaluation results at 60° C., 70° C., and 80° C. are all x, and at last, the evaluation result is o at 110° C. From the results described above, it is found that by using the non-liquid crystal monomer, the drying temperature can be dramatically decreased.

In addition, when the drying temperature exceeds 100° C., in view of dimensional accuracy, it is difficult to use a resin film as a substrate supporting the alignment film and the paint. Therefore, when a resin film is used as a substrate supporting the alignment film and the paint, the drying temperature is preferably set to 100° C. or less (such as 60° C. to 80° C.). From the columns of the example of FIG. 12, it is found that by using the polymerizable monomer having a methacrylate or an acrylate structure as the non-liquid crystal monomer 20, the drying temperature can be sufficiently decreased lower than a heat resistant temperature of the resin film in view of dimensional accuracy. Therefore, in the paint 1 of this embodiment, a resin film can be used as a substrate supporting the paint 1.

In addition, in the case in which the content of the material shown in the column of the example of FIG. 12 used as the liquid crystal monomer 10 is set to 10 to 50 percent by weight, and the content of one of the materials shown in the columns of the example of FIG. 12 used as the non-liquid crystal monomer 20 is set to 5 to 10 percent by weight on a weight ratio to that of the liquid crystal monomer 10, evaluation results similar to those shown in the columns of the example of FIG. 12 can be obtained.

In addition, in the case in which the monomer which has an isocyanuric ring structure having at least three functional groups is used as the non-liquid crystal monomer in the paint of this embodiment, compared with the case in which another material is used as the non-liquid crystal monomer 20, when the weight content of the non-liquid crystal monomer 20 and the drying temperature are respectively set equal to those of the above comparative case, the number of bright points contained in an area of $3.0 \times 10^5$ µm$^2$ can be reduced or can be made zero. In addition, when the monomer which has an isocyanuric ring structure having at least three functional groups is used as the non-liquid crystal monomer 20, the number of slight alignment defects which may not be observed by an optical microscope can also be significantly reduced as well as the number of bright points. Hence, for example, in the case in which the monomer which has an isocyanuric ring structure having at least three functional groups is used as the non-liquid crystal monomer 20, when the content of the non-liquid crystal monomer 20 is set to 5 to 10 percent by weight on a weight ratio to that of the liquid crystal monomer 10, the number of the bright points contained in an area of $3.0 \times 10^5$ µm$^2$ can be reduced to zero, and furthermore, the number of slight alignment defects which may not be observed by an optical microscope can also be significantly reduced.

2. Second Embodiment

Figure 13:
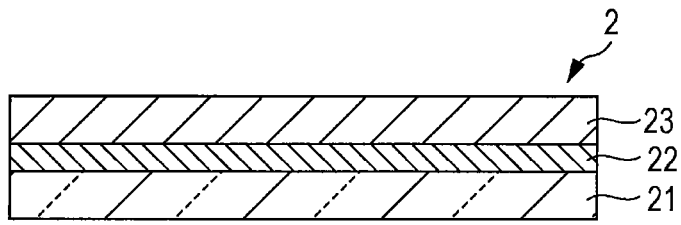
FIG. 13 is a cross-sectional view showing one example of the structure of a retardation element according to a second embodiment of the present disclosure.

Next, a retardation element 2 according to a second embodiment of the present disclosure will be described. FIG. 13 shows one example of a cross-sectional structure of the retardation element 2. The retardation element 2 is an element which changes the polarization state of incident light. The retardation element 2 is formed using the paint 1 described above, and for example, as shown in FIG. 13, is formed by laminating an alignment film 22 and a retardation layer 23 on a substrate 21 in this order.

The substrate 21 is formed of a material, such as a glass plate or a transparent resin film, having optical transparency. As the transparent resin film, a film having low optical anisotropy, that is, low birefringence, is preferable. As the transparent resin film described above, for example, COC (cyclic olefin copolymer), COP (cyclo-olefin polymer), Zeonor (registered trademark) or ZEONEX (registered trademark) by Zeon Corp., ARTON (registered trademark) by JSR Corp, TAC (triacetyl cellulose), or PET (polyethylene terephthalate) may be mentioned.

The alignment film 22 is a film having an alignment function to align a liquid crystal or the like, and for example, as described later, the alignment film 22 has a function to align the liquid crystal monomer 10 contained in the paint 1 applied on the alignment film 22 in a specific direction. The alignment film 22 includes a plurality of fine grooves extending in one direction in the plane. The fine grooves of the alignment film 22 are formed, for example, by a rubbing treatment. The retardation layer 23 is a thin layer having optical anisotropy and has a function to change the polarization state of incident light. The retardation layer 23 is provided on the surface of the alignment film 22. The retardation layer 23 is a layer formed, for example, by applying the paint 1 of the first embodiment on the surface of the alignment film 22 and then polymerizing the paint while the liquid crystal monomer 10 contained therein is placed in an alignment state. The retardation layer 23 has a lagging axis in one direction in the plane. The lagging axis extends in the direction parallel to the extending direction of the fine groove of the alignment film 22 or intersects the extending direction at a predetermined angle.

Figure 14A:
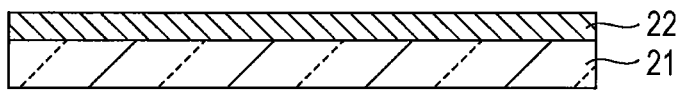
FIGS. 14A to 14D are each a schematic view illustrating one example of a method for manufacturing the retardation element shown in FIG. 13.

For example, the retardation element 2 of this embodiment can be manufactured as described below. First, for example, after being applied on the entire surface of the substrate 21, a polyimide resin is dried and fired. When a plastic substrate is used as the substrate 21, an applied material can also be vacuum-dried and fired at 100° C. Next, a rubbing treatment is performed on the applied material. Accordingly, the alignment film 22 having a desired alignment function is formed (FIG. 14A). Next, a sealing agent is applied, for example, to form a frame shape in order to prevent leakage of the paint 1 which is next to be applied. This sealing agent can be applied by a dispenser method or a screen printing method.

Figure 14B:
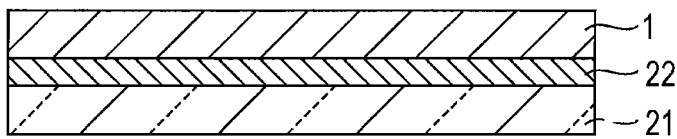

Next, the paint 1 in a predetermined volume is uniformly applied on the surface of the alignment film 22 (FIG. 14B). Although the application of the paint 1 is preferably performed using a linear-guide type precision dispenser, a die coater or the like may also be used using a sealing agent as a bank. In this embodiment, in the paint 1, an initiator (polymerization initiator) is added besides the liquid crystal monomer 10 and the non-liquid crystal monomer 20. In accordance with an ultraviolet wavelength to be used, the weight ratio of the initiator to be added is adjusted within a predetermined range. In addition, to this paint 1, for example, a polymerization inhibitor, a plasticizer, and/or a viscosity modifier may also be added, if necessary. When the paint 1 is a solid or a gel at room temperature, a nozzle, a syringe, or a substrate is preferably heated.

Figure 14C:
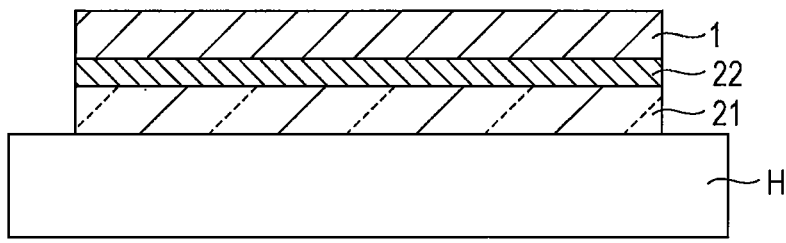
Figure 14D:
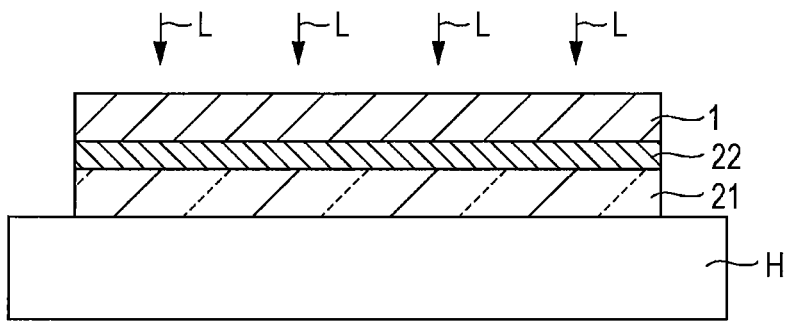

Next, if necessary, an alignment treatment is preferably performed (not shown). When the substrate 21 provided with the paint 1 is placed between cross Nicol polarizers, if alignment disorder occurs, the paint 1 is heat-treated for a predetermined period of time for alignment. For example, as shown in FIG. 14C, a heater H disposed at the rear surface of the substrate 21 is heated, and by this heat, the paint 1 is heat-treated. When a plastic substrate is used as the substrate 21, the heating temperature in this case is preferably 100° C. or less (such as 60° C. to 80° C.). Then, while the substrate 21 is heated, the liquid crystal monomer 10 is irradiated with ultraviolet rays L for polymerization thereof (FIG. 14D). In addition, while being irradiated with ultraviolet rays L, the paint 1 is preferably controlled so that the temperature thereof is not changed. It is preferable to use an infrared cut filter or to use a UV-LED or the like as a light source. As described above, the retardation element 2 is manufactured.

According to this embodiment, the paint 1 of the above embodiment is used. Accordingly, in the case in which after the paint 1 is applied on the alignment film 22, an alignment treatment is performed on the paint 1 without providing an alignment film on the upper surface thereof, an alignment restraining force of the alignment film 22 can also be allowed to work on molecules of the liquid crystal monomer 10 distributed in the upper surface of the paint 1. As a result, although the non-liquid crystal monomer 20 which can also be regarded as an impurity is contained in the paint 1, good alignment characteristics can be obtained, and a high yield can be realized.

In addition, in this embodiment, the paint 1 of the above embodiment is used. Accordingly, even if the liquid crystal monomer having a monofunctional group is not contained at all in the paint 1 or is contained only in a small amount therein, the retardation layer 23 can be formed at a low viscosity which is practically usable. Hence, for example, when the liquid crystal monomer having a monofunctional group is not contained at all in the paint 1 or is contained only in a small amount therein, and this paint 1 is applied on the alignment film 22 and is formed into the retardation element 2 by curing, the heat resistant temperature (Tg) of the retardation element 2 can be sufficiently increased higher than the heat resistant temperature of a retardation element formed by curing a paint containing a large amount of the liquid crystal monomer having a monofunctional group. In addition, the material used for the non-liquid crystal monomer 20 contained in the paint 1 is a commonly available material and is not a special material. Hence, in the retardation element 2 of this embodiment and the manufacturing method thereof, the retardation element 2 having a high heat resistant temperature (Tg) can be realized using a commonly available material. As a result, since the change in dimension of the retardation element 2 caused by heating is small, the temperature dependence of optical properties of the retardation element 2 can be reduced.

In addition, in this embodiment, since the paint 1 of the above embodiment is used, the liquid crystal monomer 10 on the alignment film 22 can be aligned without increasing the temperature to align the liquid crystal monomer 10 as high as more than 100° C. (that is, a low temperature of approximately 60° C. to 80° C.). Accordingly, since the drying temperature can be sufficiently decreased lower than the heat resistant temperature of the resin film in view of dimensional accuracy, the resin film can be used as the substrate 21 supporting the paint 1.

In addition, when the monomer which has an isocyanuric ring structure having at least three functional groups is used as the non-liquid crystal monomer 20, the number of slight alignment defects which may not be observed by an optical microscope can also be significantly reduced as well as the number of bright points. Accordingly, since significantly excellent alignment characteristics can be obtained in this case, for example, when the retardation element 2 is provided on an image display surface 3A of a display device 3 which will be described later, the black luminance can be significantly reduced, and furthermore, a high contrast can also be obtained.

FIG. 15 is a table showing the measurement values of the black luminance, the white luminance, and the contrast obtained from the ratio therebetween, the black luminance and the white luminance being obtained by using the materials shown in the columns of the example of FIG. 2 (paint of the example) and the material (LC242) shown in the column of the comparative example of FIG. 2 as a material for the paint.

Measurement of the black luminance and the white luminance was performed as described below. First, the retardation element formed by using the paint according to the example or the paint according to the comparative example is disposed between a pair of polarizers in a cross Nicol arrangement and is then rotated. In the state described above, light is allowed to enter from one polarizer side, and the luminance of light emitted from the other polarizer (that is, transmitted light) is measured. In this case, the minimum measured valve is regarded as the black luminance, and the maximum measured value is regarded as the white luminance.

In addition, the manufacturing conditions of the retardation element according to the example are as described below. As the liquid crystal monomer, 17.68 percent by weight of the material shown in the column of the example of FIG. 15 was used. As the non-liquid crystal monomer, 5 percent by weight of the material shown in the column of the example of FIG. 15 on a weight ratio to the content of the liquid crystal monomer was used. As the other materials, 0.98 percent by weight of initiator IRG907 (manufactured by BASF Ltd.), 0.096 percent by weight of surfactant B330 (BYK Japan KK), and 80.4 percent by weight of a solution of PGMEA:butyl acetate=50:50 were used. The alignment treatment temperature was set to 80° C.

The manufacturing conditions of the retardation element according to the comparative example are as described below. As the liquid crystal monomer, 17.68 percent by weight of LC242 was used. As the other materials, 0.99 percent by weight of initiator IRG907 (manufactured by BASF Ltd.), 0.099 percent by weight of surfactant B330 (BYK Japan KK), and 81.0 percent by weight of a solution of PGMEA:butyl acetate=50:50 were used. The alignment treatment temperature was set to 80° C.

From FIG. 15, it is found that in the retardation element 2 using the polymerizable monomer which has an isocyanuric ring structure having at least three functional groups as the non-liquid crystal monomer 20, the black luminance is lowest and the contrast is highest. The reason for this is that since the polymerizable monomer as described above is used as the non-liquid crystal monomer 20, the number of slight alignment defects which may not be observed by an optical microscope can also be significantly reduced as well as the number of bright points.

Besides these effects described above, in the method for manufacturing a retardation element according to the example, since the liquid crystal monomer having a monofunctional group is not necessarily added unlike the case of a related technique, a liquid crystal monomer having at least two functions can be added without any pretreatment. In the liquid crystal monomer having at least two functions, the two ends of a mesogneic group are fixed by crosslinking, and the influence of molecular fluctuation is decreased. Hence, in the retardation element according to the example, high reliability can be obtained under high-temperature and high-humidity conditions.

FIG. 16 shows the results of the heat resistant temperature (Tg) and the retardation reduction rate of each of the retardation elements according to an example and comparative examples. As shown in the following formula, the retardation reduction rate indicates a value which is obtained in such a way that the change in retardation (reduction amount) caused when a retardation element is placed under predetermined conditions for a predetermined period of time is divided by the retardation value before the retardation element is placed under the conditions as described above, and the value obtained thereby is multiplied by 100. The retardation reduction rate of the left side in FIG. 16 is the result obtained when the retardation element is placed for 500 hours in a dry environment at 90° C., and the retardation reduction rate of the right side in FIG. 16 is the result obtained when the retardation element is placed for 500 hours in an environment at 60° C. and 90% RH. In addition, the initial retardation (retardation before the start of test) of each of the retardation elements according to the example and comparative examples was 126 nm.

$$\Delta Re=(Re_2-Re_1)/Re_1 \times 100$$

$\Delta Re$: retardation reduction rate $Re_1$: retardation of the retardation element before it is placed under a predetermined environment.

$Re_2$: retardation of the retardation element after it is placed for a predetermined period of time under a predetermined environment.

In the retardation element according to the example, a compound containing the materials shown in the columns of the example of FIG. 16 was used as the paint. On the other hand, in the retardation element according to the comparative example, as the liquid crystal paint, a compound containing the material shown in the column of the comparative example of FIG. 16 was used.

In addition, the manufacturing conditions of the retardation element according to the example are as described below. As the liquid crystal monomer, 17.68 percent by weight of the material shown in the column of the example of FIG. 16 was used. As the non-liquid crystal monomer, 5 percent by weight of the material shown in the column of the example of FIG. 16 on a weight ratio to the content of the liquid crystal monomer was used. As the other materials, 0.98 percent by weight of initiator IRG907 (manufactured by BASF Ltd.), 0.096 percent by weight of surfactant B330 (BYK Japan KK), and 80.4 percent by weight of a solution of PGMEA:butyl acetate=50:50 were used. The alignment treatment temperature was set to 80° C.

On the other hand, the manufacturing conditions of the retardation element according to the comparative example 2 are as described below. As the liquid crystal monomer, 17.68 percent by weight of LC242 was used. As the other materials, 0.99 percent by weight of initiator IRG907 (manufactured by BASF Ltd.), 0.099 percent by weight of surfactant B330 (BYK Japan KK), and 81.0 percent by weight of a solution of PGMEA:butyl acetate=50:50 were used. The alignment treatment temperature was set to 80° C.

From FIG. 16, it is found that the heat resistant temperature (Tg) of the retardation element according to the example is equivalent to that of the retardation element according to comparative example 2 and is superior to that of the retardation element according to comparative example 1. That is, it is found that the heat resistant temperature (Tg) is not substantially changed by addition of the non-liquid crystal monomer. In addition, from FIG. 16, it is found that the retardation reduction rate of the retardation element according to the example is equivalent to that of the retardation element according to comparative example 2 and is superior to that of the retardation element according to comparative example 1. That is, it is found that the retardation reduction rate is not substantially changed by addition of the non-liquid crystal monomer.

Modification of Second Embodiment

In addition, in the retardation element 2 of this embodiment, the alignment film 22 may be formed of a plurality of types of alignment regions in which the extending directions of the fine grooves are different from each other. In this case, the retardation layer 23 is formed of a plurality of types of retardation regions having lagging axes in the directions corresponding to the extending directions of the fine grooves included in the alignment regions.

3. Third Embodiment

Figure 17:
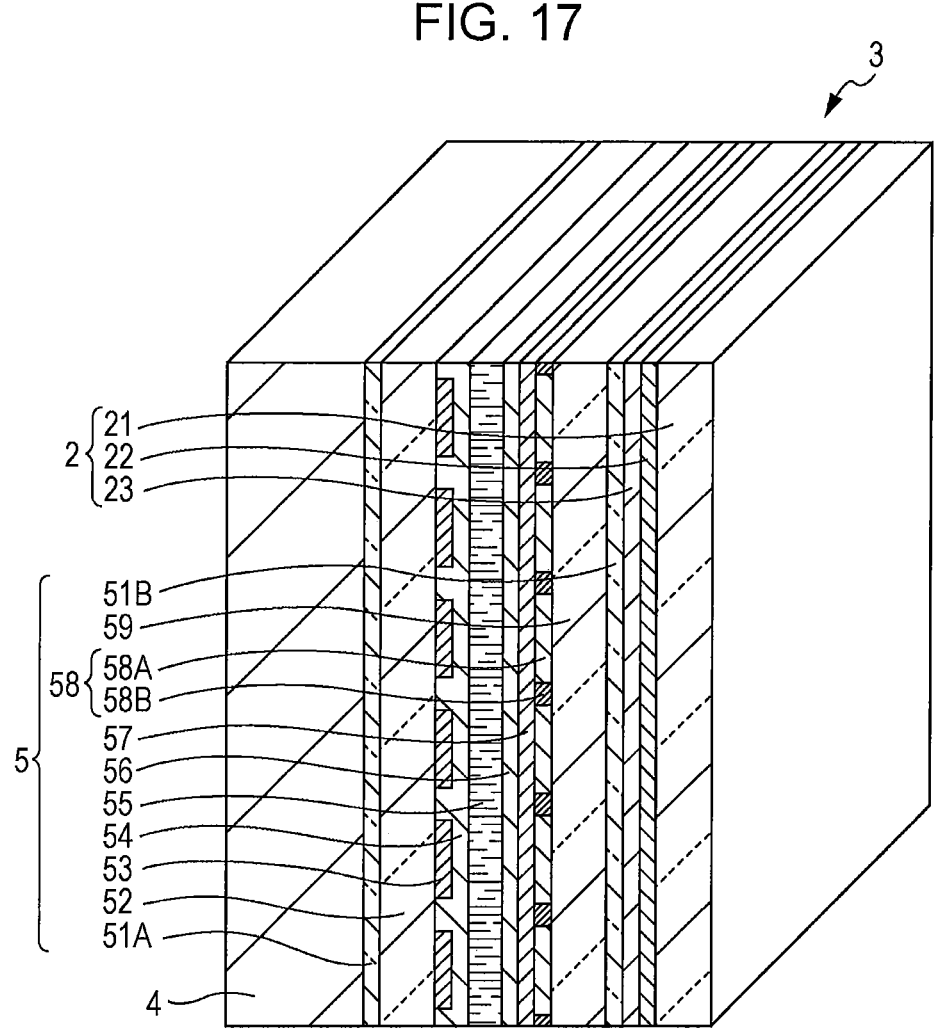
FIG. 17 is a cross-sectional view showing one example of the structure of a display device according to a third embodiment of the present disclosure.

Next, the display device 3 according to a third embodiment of the present disclosure will be described. FIG. 17 is a perspective view showing one example of a cross-sectional structure of the display device 3. The display device 3 is a polarized glass type display device which displays a stereoscopic image to a viewer (not shown) wearing a pair of polarized glasses 6, which will be described later, in front of the eyeballs of the viewer. This display device 3 is formed by laminating a backlight unit 4, a liquid crystal display panel 5, and a retardation element 2 in this order. Incidentally, the liquid crystal display panel 5 corresponds to one particular example of the "display panel" of the present disclosure. In this display device 3, the retardation element 2 is adhered to a surface of the liquid crystal display panel 5 at a light emission side. The surface of the retardation element 2 functions as the image display surface 3A and is directed to a viewer side.

In addition, in this embodiment, the display device 3 is disposed so that the image display surface is parallel to a perpendicular plane (vertical plane). The image display surface has a rectangular shape, and a longitudinal direction of the image display surface is parallel to the horizontal direction (y axis direction in the figure). The viewer is assumed to observe the image display surface while wearing a pair of polarized glasses 6 in front of the eyeballs of the viewer. The pair of polarized glasses 6 is, for example, a circular polarized type, and the display device 3 is, for example, a display device for circular polarized glasses.

(Backlight Unit 4)

The backlight unit 4 illuminates the liquid crystal display panel 5 from the rear surface thereof. For example, the backlight 4 has a reflector plate, a light source, and an optical sheet (all not shown). The reflector plate is a plate to return light emitted from the light source to an optical sheet side and has functions, such as reflection, scattering, and diffusion. This reflector plate is formed, for example, of a foamed polyethylene terephthalate (PET). Accordingly, light emitted from the light source can be efficiently used. The light source illuminates the liquid crystal display panel 5 from the rear surface thereof and is formed such that a plurality of linear light sources is disposed parallel with predetermined intervals or a plurality of dot light sources is disposed in a two-dimensional manner. In addition, as the linear light source, for example, a hot cathode fluorescent lamp (HCFL) and a cold cathode fluorescent lamp (CCFL) may be mentioned. As the dot light source, for example, a light emitting diode (LED) may be mentioned. The optical sheet is a sheet functioning to uniform the in-plane luminance distribution of light emitted from the light source or to adjust the divergence angle and/or the polarization state of light emitted from the light source within a desired range and is formed, for example, of at least one member selected from a group consisting of a diffuser, a diffusion sheet, a prism sheet, a reflection type polarization element, and a retardation film.

(Liquid Crystal Display Panel 5)

The liquid crystal panel 5 is a transmission type display panel in which a plurality of pixels is two-dimensionally arranged in a row and a column direction and displays an image by driving individual pixels in accordance with image signals. This liquid crystal display panel 5 has, for example, as shown in FIG. 17, a polarizer 51A, a transparent substrate 52, pixel electrodes 53, an alignment film 54, a liquid crystal layer 55, an alignment film 56, a common electrode 57, a color filter 58, a transparent substrate 59, and a polarizer 51B in this order from a backlight unit 4 side.

The polarizer 51A is a polarizer arranged at a light incidence side of the liquid crystal display panel 5, and the polarizer 51B is a polarizer arranged at a light emission side of the liquid crystal display panel 5. The polarizers 51A and 51B are each a type of optical shutter and allow only light having a predetermined vibration direction to pass therethrough. The polarizers 51A and 51B are disposed so that the polarization axes thereof intersect with each other at a predetermined angle (such as 90° C.), and hence emission light emitted from the backlight unit 4 is allowed to pass through the liquid crystal layer or is blocked.

The direction of the transmission axis (not shown) of the polarizer 51A is set in a range in which light emitted from the backlight unit 4 is allowed to pass. For example, when the polarization axis of light emitted from the backlight unit 4 is in a perpendicular direction, the transmission axis of the polarizer 51A is also in the perpendicular direction. In addition, for example, when the polarization axis of light emitted from the backlight unit 4 is in the horizontal direction, the transmission axis of the polarizer 51A is also in the horizontal direction. The light emitted from the backlight unit 4 is not limited to linearly polarized light, and circularly polarized light, elliptically polarized light, and non-polarized light may also be used.

The direction of the polarization axis (not shown) of the polarizer 51B is set in a range in which light passing through the liquid crystal panel 54 is allowed to pass. For example, when the polarization axis of the polarizer 51A is in the horizontal direction, the polarization axis of the polarizer 51B is in a direction perpendicular thereto (perpendicular direction). When the polarization axis of the polarizer 51A is in the perpendicular direction, the polarization axis of the polarizer 51B is in a direction perpendicular thereto (horizontal direction).

In general, the transparent substrates 52 and 59 are each a substrate transparent to visible light. In addition, on the transparent substrate at the backlight unit 4 side, an active type drive circuit is formed which includes, for example, thin film transistors (TFTs) as drive elements electrically connected to transparent pixel electrodes and wires. The pixel electrodes 53 are disposed, for example, in the plane of the transparent substrate 52 in a matrix arrangement. This pixel electrode 53 is formed, for example, of indium tin oxide (ITO) and functions as an electrode of the corresponding pixel. The alignment film 54 is formed, for example, of a polymer material, such as a polyimide, and performs an alignment treatment on a liquid crystal. The liquid crystal layer 55 is formed, for example, of a vertical alignment (VA) mode, a twisted nematic (TN) mode, or a super twisted nematic (STN) mode liquid crystal. By an applied voltage from the drive circuit not shown in the figure, this liquid crystal layer 55 has a function for each pixel to allow light emitted from the backlight unit 4 to pass or not. The common electrode 57 is formed, for example, of ITO and functions as a common counter electrode. The color filter 58 is formed by arranging filter portions 58A which perform color separation of emission light emitted from the backlight unit 4 into the three primary colors, such as red (R), green (G), and blue (B). In this color filter 58, a black matrix portion 58B having a shielding function is provided in an area corresponding to the boundaries between the pixels.

(Retardation Element 2)

Figure 18A:
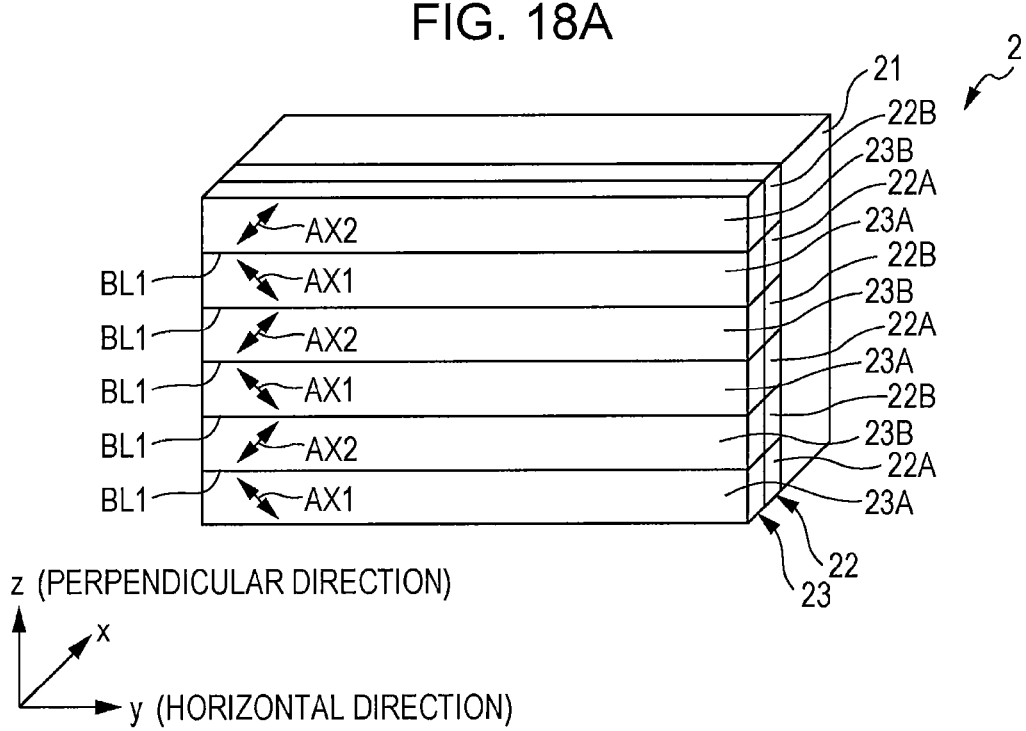
FIG. 18A is a perspective view showing one example of the structure of the retardation element shown in FIG. 17.
Figure 18B:
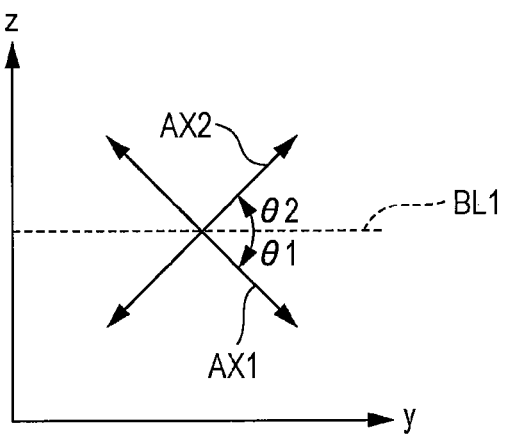
FIG. 18B is a graph showing one example of the optical axes of the retardation element shown in FIG. 18A.

Next, the retardation element 2 will be described. FIG. 18A is a perspective view showing one example of the structure of the retardation element 2 of this embodiment. FIG. 18B shows the lagging axes of the retardation element 2 shown in FIG. 18A.

The retardation element 2 changes the polarization state of light passing through the polarizer 51B of the liquid crystal display panel 5. The retardation element 2 is provided at an opposite side of the backlight unit 4 with respect to the liquid crystal display panel 5 and has, for example, as shown in FIGS. 17 and 18A, the substrate 21, the alignment film 22, and the retardation layer 23 in this order form an image display surface 3A side.

As shown in FIG. 18A, the alignment film 22 has right-eye regions 22A and left-eye regions 22B. The right-eye regions 22A and the left-eye regions 22B have belt shapes extending in one common direction (such as the horizontal direction). The right-eye regions 22A and the left-eye regions 22B are regularly arranged adjacent to each other in a plane direction of the substrate 21 and are, for example, alternately arranged along a short side direction (such as the perpendicular direction) of the right-eye regions 22A and the left-eye regions 22B. Therefore, in this case, the boundary line at which the right-eye region 22A and left-eye region 22B are adjacent to each other (in contact with each other) extends in the same direction as the longitudinal direction (horizontal direction) of the right-eye region 22A and the left-eye region 22B. In addition, the right-eye regions 22A and the left-eye regions 22B are arranged corresponding to the arrangement of the pixel electrodes 53.

In addition, for example, the right-eye region 22A includes a plurality of fine grooves extending in a direction which intersects the extending direction of the right-eye region 22A at an angle other than the right angle. On the other hand, for example, the left-eye region 22B includes a plurality of fine grooves extending in a direction which intersects the extending direction of the left-eye region 22B at an angle other than the right angle and which is different from the extending direction of the fine grooves of the right-eye region 22A. For example, the extending direction of the fine grooves of the right-eye region 22A orthogonally intersects the extending direction of the fine grooves of the left-eye region 22B.

The retardation layer 23 is provided on the surface of the alignment film 22 and is adhered on the surface (polarizer 51B) of the liquid crystal display panel 5 at an emission light side. The retardation layer 23 is formed, for example, by the steps of applying the paint 1 on the surface of the alignment film 22, performing alignment of the liquid crystal monomer 10, and then polymerizing the aligned liquid crystal monomer 10. The retardation layer 23 has two types of retardation regions (right-eye regions 23A and left-eye regions 23B) having lagging axes in different directions from each other.

As shown in FIG. 17 and FIG. 18A, the right-eye regions 23A and the left-eye regions 23B have belt shapes extending in one common direction (such as the horizontal direction). These right-eye regions 23A and the left-eye regions 23B are regularly arranged adjacent to each other in a plane direction of the alignment film 22 and, in particular, are alternately arranged in a short side direction (such as the perpendicular direction) of the right-eye regions 23A and the left-eye regions 23B. The right-eye regions 23A of the retardation layer 23 are arranged right above the respective right-eye regions 22A shown in FIG. 18A, and the left-eye regions 23B of the retardation layer 23 are arranged right above the respective left-eye regions 22B shown in FIG. 18A. In addition, the right-eye regions 23A and the left-eye regions 23B of the retardation layer 23 are arranged so as to correspond to the arrangement of the pixel electrodes 53.

As shown in FIGS. 18A and 18B, the right-eye region 23A of the retardation layer 23 has a lagging axis AX1 in the direction which intersects a boundary line BL1 at which the right-eye region 23A and the left-eye region 23B of the retardation layer 23 are adjacent to each other (in contact with each other) at an angle θ1 other than the right angle. On the other hand, as shown in FIGS. 18A and 18B, the left-eye region 23B of the retardation layer 23 has a lagging axis AX2 in the direction which intersects the boundary line BL1 at an angle θ2 other than the right angle and which is different from the direction of the lagging axis AX1. The lagging axis AX1 and the lagging axis AX2 intersect each other, for example, at the right angle, and for example, θ1 is set to −45° (45° in a clockwise direction on the basis of the boundary line BL1), and θ2 is set to +45° (45° in a counter clockwise direction on the basis of the boundary line BL1).

In this embodiment, the different direction from the direction of the lagging axis AX1" not only indicates that the direction of the lagging axis AX2 is different from the direction of the lagging axis AX1 but also indicates that the lagging axis AX2 rotates in a direction opposite to that of the lagging axis AX1 with respect to the boundary line BL1. That is, the lagging axes AX1 and AX2 rotate in different directions with respect to the boundary line BL1. The absolute value of the angle θ1 of the lagging axis AX1 is preferably the same as the absolute value of the angle θ2 of the lagging axis AX2 (in the case in which the rotation direction is no taken into consideration). However, these angles, directions, and the like may be slightly different from each other due to manufacturing errors (manufacturing variation) and the like.

Figure 19A:
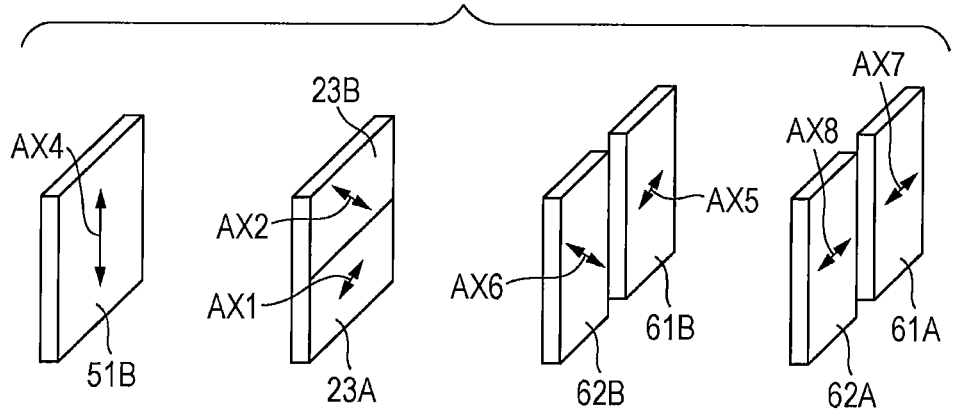
FIGS. 19A and 19B are each a schematic view illustrating the transmission axis and the lagging axis in the display device shown in FIG. 17.
Figure 19B:
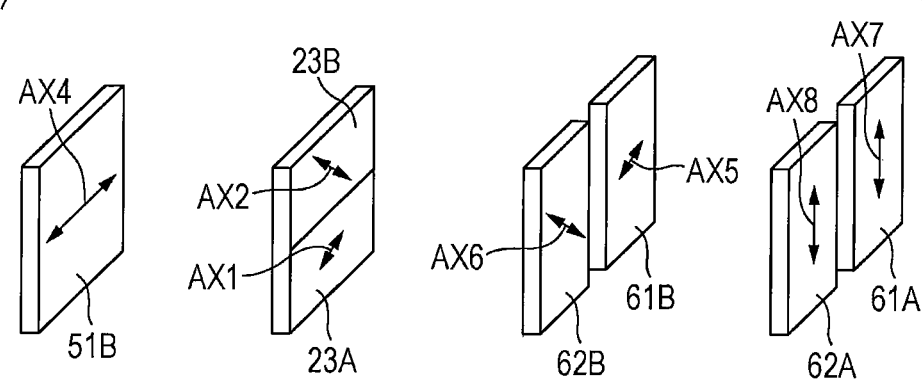

As shown in FIGS. 19A and 19B, the lagging axes AX1 and AX2 are in the directions which also intersect a polarization axis AX4 of the polarizer 51B of the liquid crystal display panel 5. Furthermore, the lagging axis AX1 is in the direction which is the same as or is corresponding to the direction of a lagging axis AX5 of a right-eye retardation film 61B of a pair of polarized glasses 6 which will be described later and is in the direction different from the direction of a lagging axis AX6 of a left-eye retardation film 62B of the pair of polarized glasses 6. On the other hand, the lagging axis AX2 is in the direction which is the same as or is corresponding to the direction of the lagging axis AX6 and is in the direction different from the direction of the lagging axis AX5.

(Polarization Glasses 6)

Figure 20:
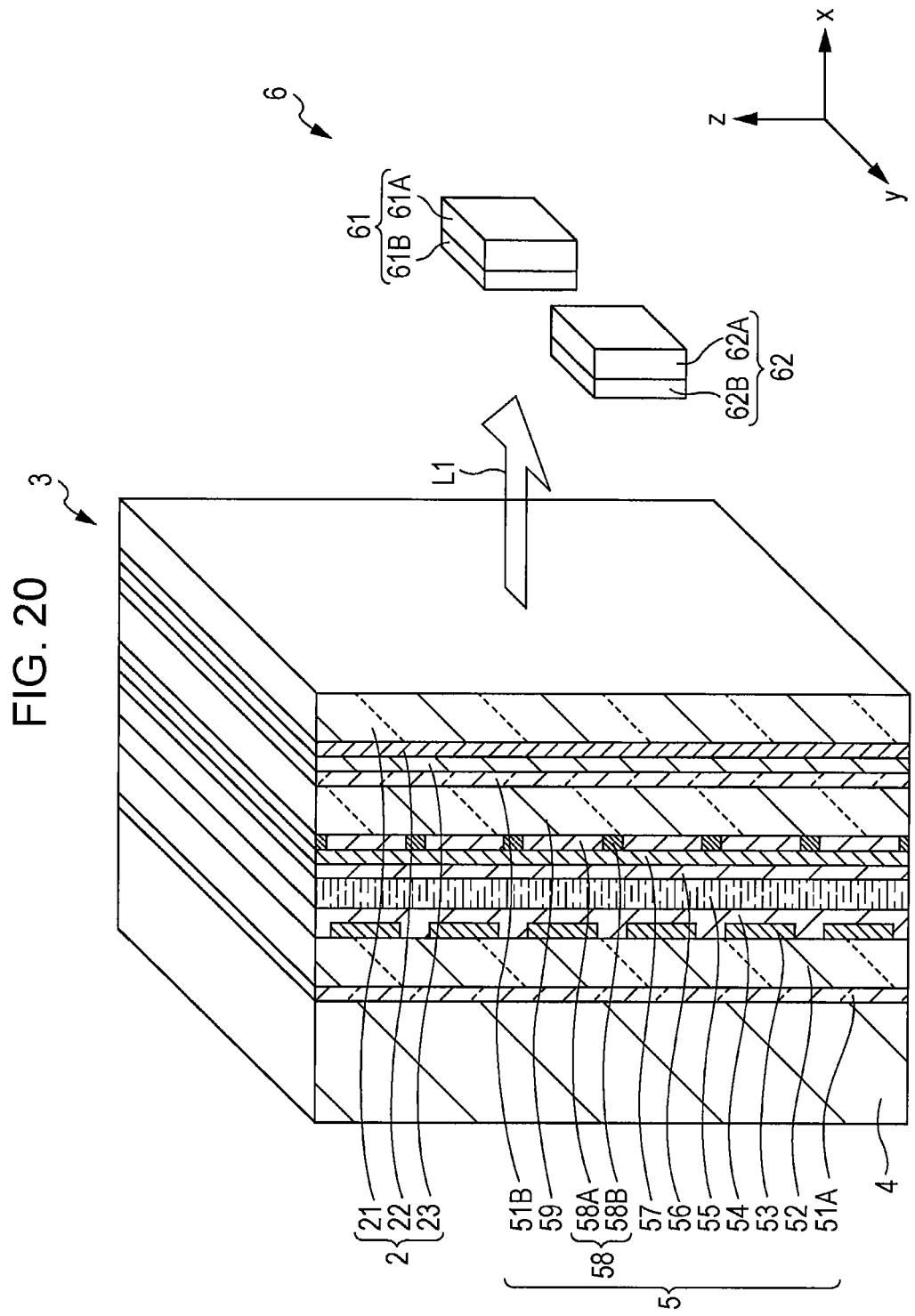
FIG. 20 is a system chart showing the relationship between the display device shown in FIG. 17 and a pair of polarized glasses.

Next, the pair of polarized glasses 6 will be described. FIG. 20 is a perspective view showing one example of the structure of the pair of polarized glasses 6 together with the display device 3. The pair of polarized glasses 6 is placed in front of the eyeballs of a viewer (not shown) and is used by the viewer when an image displayed on the image display surface 3A is observed. As shown in FIG. 20, the pair of polarized glasses 6 has, for example, a right-eye glass 61 and a left-eye glass 62.

The right-eye glass 61 and the left-eye glass 62 are arranged so as to face the image display surface 3A of the display device 3. As shown in FIG. 20, the right-eye glass 61 and the left-eye glass 62 are preferably arranged in one horizontal plane as much as possible but may also be arranged in a slightly inclined flat plane.

The right-eye glass 61 selectively allows right-eye image light L2 of image light L1 emitted from the display device 3 to pass therethrough and has, for example, a polarizer 61A and the right-eye retardation film 61B. On the other hand, the left-eye glass 62 selectively allows left-eye image light L3 of the image light L1 emitted from the display device 3 to pass therethrough and has, for example, a polarizer 62A and the left-eye retardation film 62B. The right-eye retardation film 61B is provided on the surface of the polarizer 61A at a light incident side. The left-eye retardation film 62B is provided on the surface of the polarizer 62A at a light incident side.

The polarizers 61A and 62A are arranged at a light emission side of the polarized glasses 6 and each only allows light (polarized light) having a predetermined vibrating direction to pass therethrough. Polarization axes AX7 and AX8 of the respective polarizers 61A and 62A are in the directions perpendicular to the polarization axis AX4 of the polarizer 51B of the display device 3 (FIGS. 19A and 19B). As shown in FIGS. 19A and 19B, for example, the polarization axes AX7 and AX8 are in the horizontal direction when the polarization axis AX4 is in the perpendicular direction and are in the perpendicular direction when the polarization axis AX4 is in the horizontal direction.

The right-eye retardation film 61B and the left-eye retardation film 62B are thin layers each having optical anisotropy. As shown in FIGS. 19A and 19B, the lagging axis AX5 of the right-eye retardation film 61B and the lagging axis AX6 of the left-eye retardation film 62B are in the directions which intersect both directions, the horizontal and the perpendicular directions, and are in the directions which also intersect the polarization axes AX7 and AX8 of the respective polarizers 61A and 62A. In addition, the lagging axis AX5 is in the direction which is the same as or is corresponding to that of the lagging axis AX1 and is in the direction different from the direction of the lagging axis AX2. On the other hand, the lagging axis AX6 is in the direction which is the same as or is corresponding to that of the lagging axis AX2 and is in the direction different from the direction of the lagging axis AX1.
(Basic Operation)

Next, in the display device 3 of this embodiment, one example of a basic operation of displaying an image will be described.

First, in the state in which light emitted from the backlight unit 4 is incident on the liquid crystal display panel 5, parallax signals which include a right-eye image and a left-eye image as image signals are inputted into the liquid crystal display panel 5. Then, right-eye image light is outputted from pixels located along odd-numbered lines, and left-eye image light is outputted from pixels located along even-numbered lines. Subsequently, after being converted into elliptically polarized light in the right-eye region 23A and the left-eye regions 23B of the retardation element 2 and allowed to pass through the alignment film 22 of the retardation element 2, the right-eye image light and the left-eye image light are outputted outside from the image device surface 3A of the display device 3 as the image light L1.

Subsequently, the image light L1 outputted from the display device 3 is incident on the pair of polarized glasses 6 and are returned from the elliptically polarized light to linearly polarized light by the right-eye retardation film 61B and the left-eye retardation film 62B, and then the image light L1 is incident on the polarizers 61A and 62A of the polarized glasses 6. At this stage, of the light (image light L1) incident on the polarizers 61A and 62A, the polarization axis of light corresponding to the right-eye image light is parallel to the polarization axis AX7 of the polarizer 61A and is perpendicular to the polarization axis AX8 of the polarizer 62A. Therefore, of the light (image light L1) incident on the polarizers 61A and 62A, the light corresponding to the right-eye image light is allowed to pass only through the polarizer 61A and reaches the viewer's right eye. On the other hand, of the light (image light L1) incident on the polarizers 61A and 62A, the polarization axis of light corresponding to the left-eye image light is perpendicular to the polarization axis AX7 of the polarizer 61A and is parallel to the polarization axis AX8 of the polarizer 62A. Therefore, of the light (image light L1) incident on the polarizers 61A and 62A, the light corresponding to the left-eye image light is allowed to pass only through the polarizer 62A and reaches the viewer's left eye.

As described above, since the light corresponding to the right-eye image light reaches the viewer's right eye, and the light corresponding to the left-eye image light reaches the viewer's left eye, the viewer can recognize as if a stereoscopic image is displayed on the image display surface 3A of the display device 3.
(Effects)

By the way, in this embodiment, since the retardation element 2 is provided on the surface of the liquid crystal display panel 5 at a light emission side, of the light (image light L1) incident on the polarizers 61A and 62A of the polarized glasses 6, the ratio of light corresponding to the right-eye image light which passes through the polarizer 62A can be significantly decreased, and as in the case described above, the ratio of light corresponding to the left-eye image light which passes through the polarizer 61A can also be significantly decreased. As a result, crosstalk can be significantly reduced. In addition, in this embodiment, the retardation element 2 having a high heat resistant temperature (Tg) formed from a commonly available material is used on the light emission side of the liquid crystal display panel 5. Accordingly, since the change in dimension of the retardation element 2 caused by heating is small, the temperature dependence of the optical properties of the retardation element 2 can be reduced. As a result, the display quality can be improved.

In addition, as the retardation element 2, when an element formed by using the paint 1 in which the monomer which has an isocyanuric ring structure having at least three functional groups is contained as the non-liquid crystal monomer 20 is used, significantly good alignment characteristics can be obtained. Accordingly, crosstalk is not only significantly reduced but the black luminance can also be reduced, and hence a high contrast can be obtained.

FIG. 21 is a table showing the measurement results of crosstalk of the display devices according to an example and comparative examples. The value of the crosstalk in the table is a value of crosstalk of right-eye image light L1. The value of the crosstalk of the right-eye image light L1 is a value obtained by the following formula.

$$\text{Cross talk of right-eye image light } L1 = (\text{luminance obtained when right-eye image light } L1 \text{ is watched via left-eye glass } 62)/(\text{luminance obtained when right-eye image light } L1 \text{ is watched via right-eye glass } 61) \times 100$$

As the crosstalk is reduced, the stereoscopic display characteristics are improved. On the other hand, as the crosstalk is increased, a so-called ghost phenomenon frequently occurs in which the left-eye image light enters the right eye, and/or the right-eye image light enters the left eye. The ghost develops eyestrain, and in a worst case scenario, it becomes difficult for a viewer to watch a stereoscopic image itself.

In the display device according to the example, the retardation element was used which was manufactured using a compound containing the materials shown in the columns of the example of FIG. 21 as the paint. On the other hand, in the display device according to the comparative example, the retardation element was used which was manufactured using the material shown in the column of the comparative example of FIG. 21 as the liquid crystal paint.

The manufacturing conditions of the retardation element according to the example are as follows. As the liquid crystal monomer, 17.68 percent by weight of the material shown in the column of the example of FIG. 21 was used. As the non-liquid crystal monomer, 5 percent by weight of the material shown in the column of the example of FIG. 21 on a weight ratio to the content of the liquid crystal monomer was used. As the other materials, 0.98 percent by weight of initiator IRG907 (manufactured by BASF Ltd.), 0.096 percent by weight of surfactant B330 (BYK Japan KK), and 80.4 percent by weight of a solution of PGMEA:butyl acetate=50:50 were used. The alignment treatment temperature was set to 80° C.

On the other hand, the manufacturing conditions of the retardation element according to Comparative Examples 4 and 5 are as follows. As the liquid crystal monomer, 17.68 percent by weight of LC242 was used. As the other materials, 0.99 percent by weight of initiator IRG907 (manufactured by BASF Ltd.), 0.099 percent by weight of surfactant B330 (BYK Japan KK), and 81.0 percent by weight of a solution of PGMEA:butyl acetate=50:50 were used. The alignment treatment temperature was set to 80° C. or 110° C.

From FIG. 21, it is found that when the display device according to the example is compared with any one of the display devices according to the comparative examples, crosstalk is suppressed, and stereoscopic display characteristics are excellent. Accordingly, it is found that when the non-liquid crystal monomer is added, the crosstalk can be effectively suppressed as compared to the case in which the process temperature is increased.

Modification of Third Embodiment

Although the two types of retardation regions (right-eye region 23A and left-eye region 23B) in which the directions of the lagging axes are different from each other are provided in the retardation element 2 according to the above third embodiment, at least three types of retardation regions in which the directions of the lagging axes are different from each other may also be provided.

In addition, although the case in which the retardation regions (right-eye regions 23A and left-eye regions 23B) of the retardation element 2 extend horizontally is described in the third embodiment by way of example, the retardation regions may also extend in another direction.

In addition, although the case in which the retardation element 2 is applied to the display device 3 is described in the third embodiment and the modification thereof by way of example, of course, the retardation element 2 may also be applied to other devices.

Furthermore, in the third embodiment and the modification thereof, the case in which the pair of polarized glasses 6 is a circular polarized type, and the display device 3 is a display device for circular polarized glasses is described by way of example, the present disclosure may also be applied to the case in which the pair of polarized glasses 6 is a linear polarization type, and the display device 3 is a display device for linear polarized glasses.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A paint comprising:
a liquid crystal monomer; and
a non-liquid crystal monomer; wherein
the content of the non-liquid crystal monomer is 5 to 10 percent by weight based on a weight ratio to that of the liquid crystal monomer; and
the non-liquid crystal monomer is a polymerizable monomer having
a methacrylate or an acrylate structure, and
an isocyanuric ring structure having at least three functional groups.

2. A retardation element comprising:
an alignment film; and
a retardation layer in contact with a surface of the alignment film, wherein the retardation layer is formed by applying a paint containing a liquid crystal monomer and a non-liquid crystal monomer on the surface of the alignment film and then polymerizing the paint while the liquid crystal monomer is placed in an alignment state; wherein
the content of the non-liquid crystal monomer in the paint is 5 to 10 percent by weight based on a weight ratio to that of the liquid crystal monomer, and
the non-liquid crystal monomer is a polymerizable monomer having
a methacrylate or an acrylate structure, and
an isocyanuric ring structure having at least three functional groups.

3. A display device comprising:
a display panel driven based on an image signal;
a backlight which illuminates the display panel from a rear surface thereof; and
a retardation element provided at an opposite side of the backlight with respect to the display panel, wherein
the retardation element includes:
an alignment film, and
a retardation layer in contact with a surface of the alignment film,
the retardation layer is formed by applying a paint containing a liquid crystal monomer and a non-liquid crystal monomer on the surface of the alignment film and then polymerizing the paint while the liquid crystal monomer is placed in an alignment state,
the content of the non-liquid crystal monomer in the paint is 5 to 10 percent by weight based on a weight ratio to that of the liquid crystal monomer, and
the non-liquid crystal monomer is a polymerizable monomer having
a methacrylate or an acrylate structure, and
an isocyanuric ring structure having at least three functional groups.

4. A method for manufacturing a retardation element comprising:
applying a paint containing a liquid crystal monomer and a non-liquid crystal monomer on a surface of an alignment film; and
then polymerizing the paint while the liquid crystal monomer is placed in an alignment state; wherein
the content of the non-liquid crystal monomer in the paint is 5 to 10 percent by weight based on a weight ratio to that of the liquid crystal monomer, and
the non-liquid crystal monomer is a polymerizable monomer having
a methacrylate or an acrylate structure, and
an isocyanuric ring structure having at least three functional groups.

* * * * *